Figure 4:
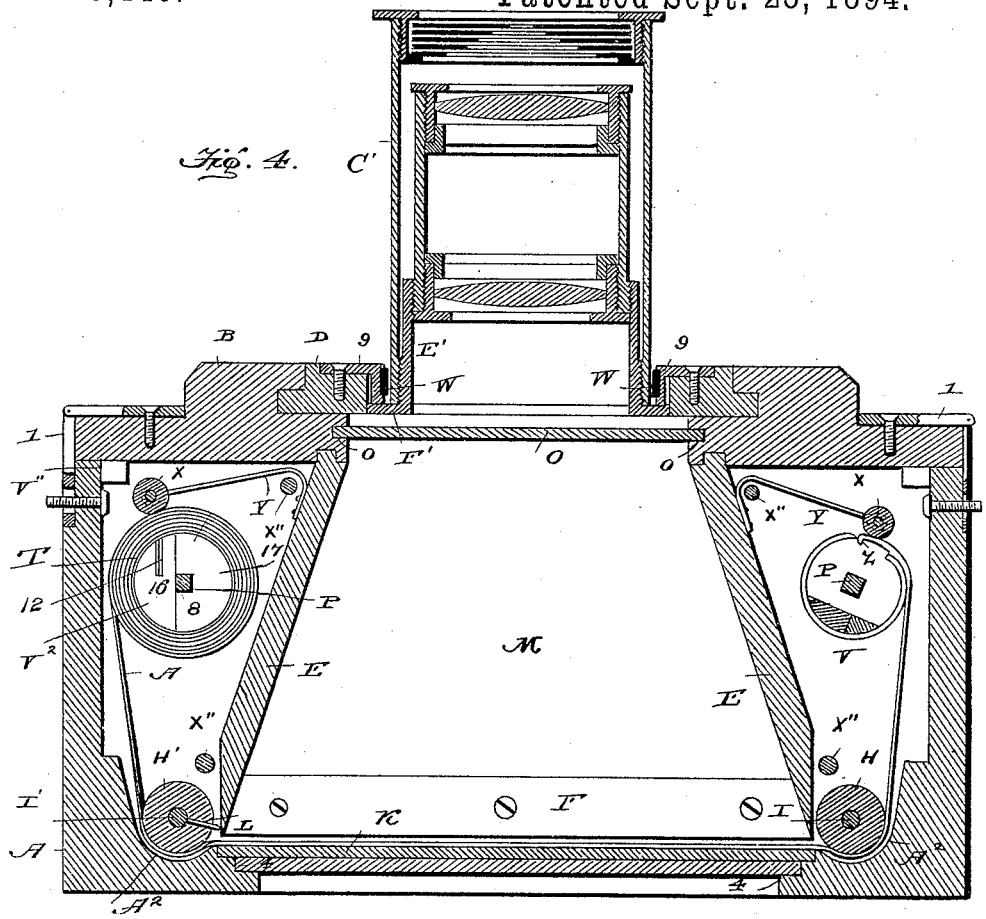

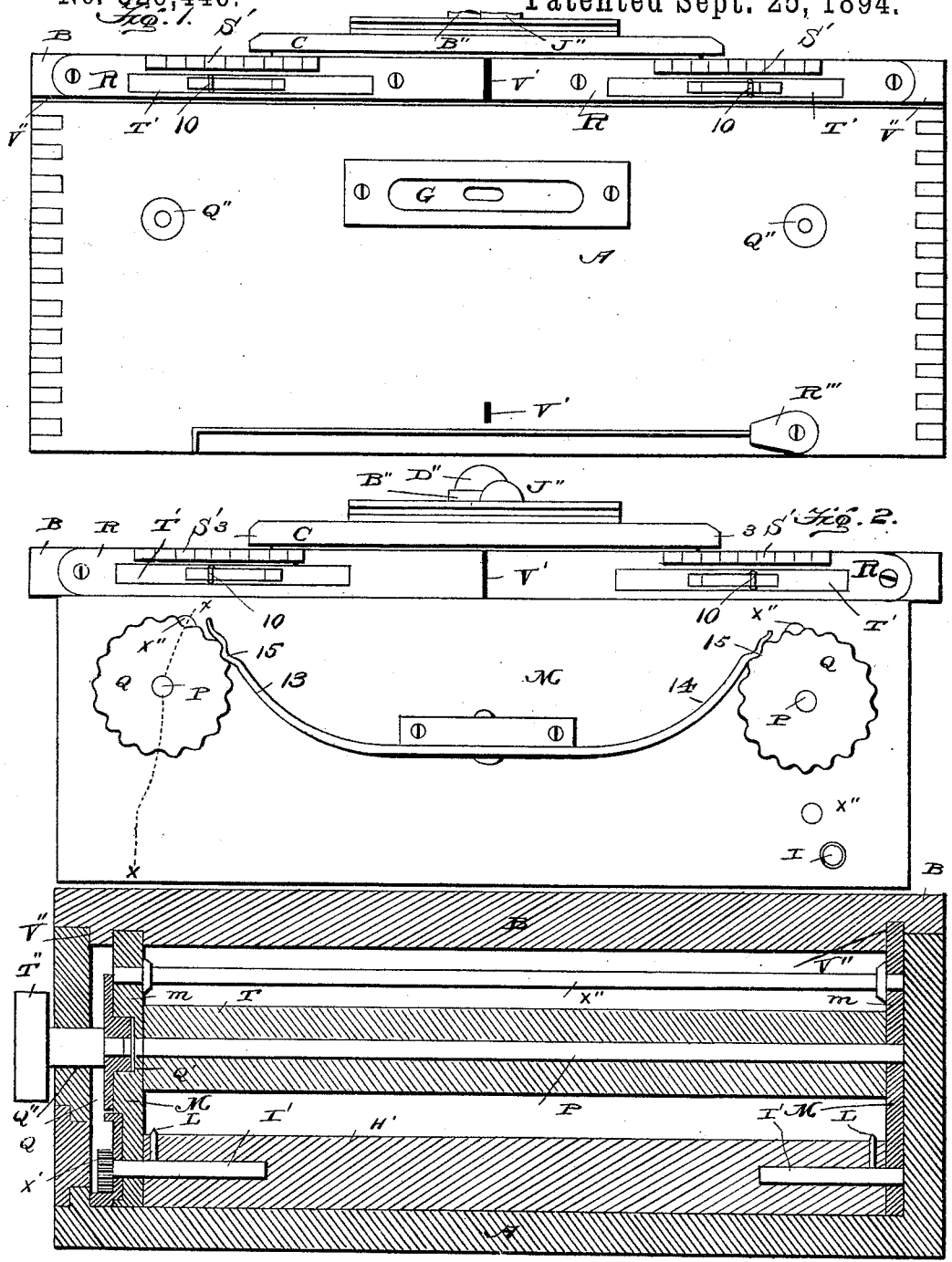

(No Model.) 4 Sheets—Sheet 2.
D. H. HOUSTON.
ROLL HOLDING PHOTOGRAPHIC CAMERA.
No. 526,446. Patented Sept. 25, 1894.
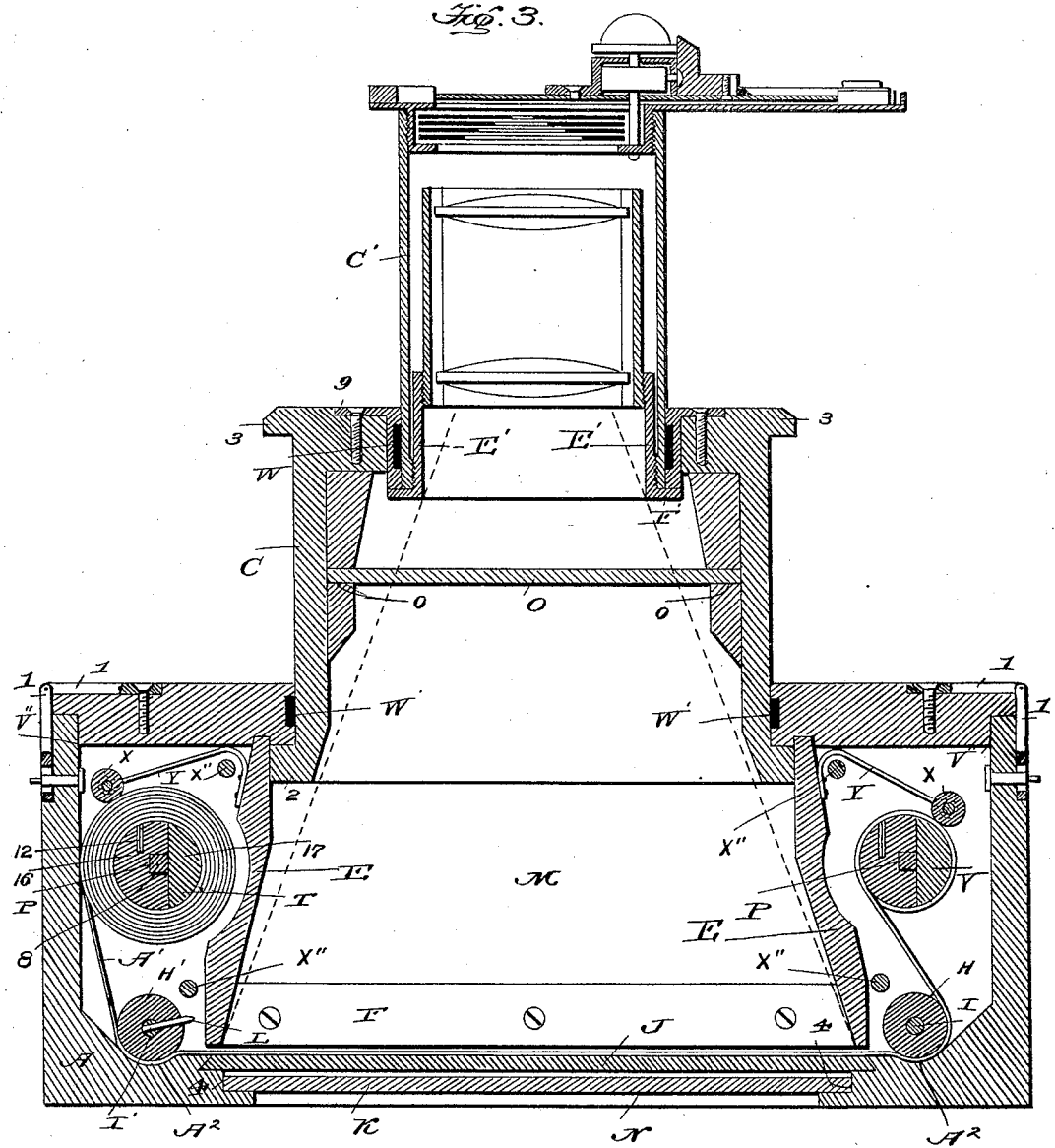
Witnesses:
D. H. Houston.
Inventor
By Edson Bros,
Att'ys.

(No Model.) 4 Sheets—Sheet 3.

D. H. HOUSTON.
ROLL HOLDING PHOTOGRAPHIC CAMERA.

No. 526,446. Patented Sept. 25, 1894.

Witnesses:
Wm. C. Dashiell
H. F. Bernhard

D. H. Houston
Inventor
By Edson Bros.
Attys.

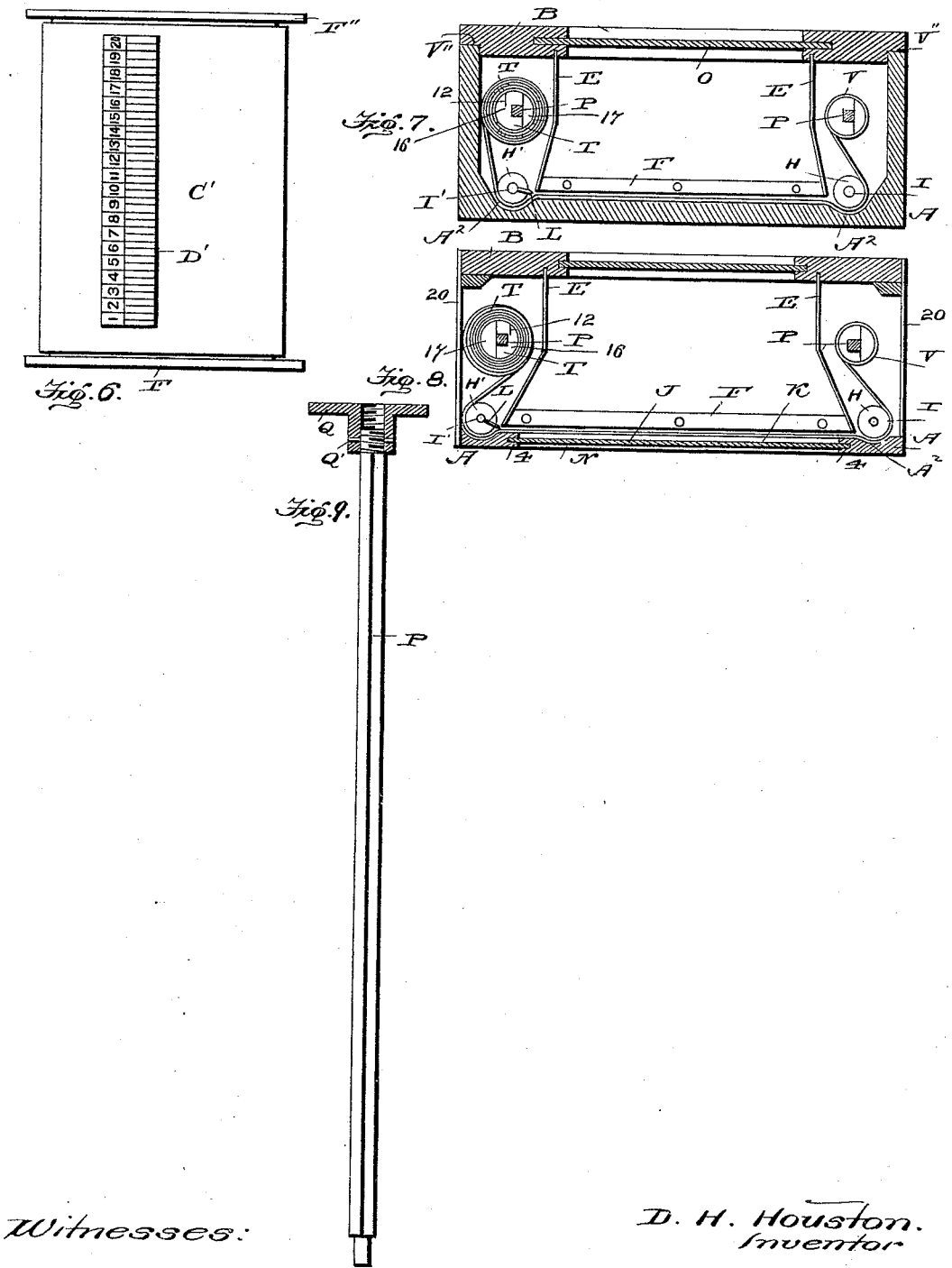

UNITED STATES PATENT OFFICE.

DAVID H. HOUSTON, OF HUNTER, NORTH DAKOTA.

ROLL-HOLDING PHOTOGRAPHIC CAMERA.

SPECIFICATION forming part of Letters Patent No. 526,446, dated September 25, 1894.

Application filed March 13, 1893. Serial No. 465,775. (No model.) Patented in Canada July 14, 1892, No. 39,339.

*To all whom it may concern:*

Be it known that I, DAVID H. HOUSTON, a citizen of the United States, residing at Hunter, in the county of Cass and State of North Dakota, have invented certain new and useful Improvements in Roll-Holding Photograph-Cameras, (patented in Canada July 14, 1892, No. 39,339;) and I do hereby declare the following to be a full, clear, and exact description of the invention, such as will enable others skilled in the art to which it appertains to make and use the same.

This application is a continuation of a prior application filed by me on the 12th day of March, 1886, Serial No. 195,019, for improvements in roll holding photographic apparatus; and the object of the invention is to provide a simple and compact apparatus which can be readily and easily carried and which can be quickly adapted for instantaneous or time exposures as may be desired.

With these ends in view, my invention consists in the combination with a suitable inclosing case, of two transverse light-excluding divisions situated interiorly within the case at suitable distances from the ends thereof, and from each other, whereby a central compartment with two isolated end compartments is provided within the case, a supply spool supported in one of the end compartments, and a take-up spool in the other end compartment, said inclosing case provided with a light inlet at the front thereof, opposite the central compartment, or with an equivalent lens mounted on the case in line with the central compartment therein and adapted to project an image on the film which passes from the supply spool to the take-up spool at the rear of the light-excluding divisions, as will be hereinafter more fully described.

My invention further contemplates reversing some of the parts of a roll holder mechanism, and placing the guides for the sensitized film at the back interior side of the holder, also the guide rollers I place at the back interior side of the holder, whereby much valuable space is saved and the instrument compacted into small convenient form.

My invention further contemplates a suitable frame which contains the operating mechanism and the lens mounted in front thereof, which frame is arranged to fit snugly in an inclosing case, its front forming one of the sides of the case.

My invention further contemplates a movable front which is arranged to telescope within the frame, which front can be quickly projected in the practical use of the apparatus, the lens-tube being carried by said telescopic front and adapted to slide within the front.

The advantages attained by a photographic apparatus constructed in accordance with my invention are numerous, and will be pointed out hereinafter.

I aim to construct an apparatus in a compact form for easy and convenient transportation, which can be quickly adapted for operation, and to arrange the various parts and the lens-tube to facilitate the operation of the apparatus.

The invention further consists in the novel combination of devices and peculiar construction and arrangement of parts as will be pointed out and claimed hereinafter.

To enable others to more readily understand my invention, I have illustrated the same in the accompanying drawings, forming a part of this specification, and in which—

Figure 1 is a top plan view of the roll-holder case containing the frame which carries the operating mechanism as combined and arranged for transportation. Fig. 2 is a top plan view of the roll holder frame carrying the operating mechanism, which frame is adapted to slide into the case and to fit snugly therein. Fig. 3 is a horizontal sectional view taken through the apparatus with the parts projected and adapted for operation. Fig. 4 is a horizontal sectional view showing a modified construction. Fig. 5 is a transverse vertical sectional view taken on the line *x x* Fig. 2 through the centers of the measuring rollers and supply spool, in one end of the frame. Fig. 6 is an elevation of the improved lens-tube showing the flanges and the scale thereon used to adjust the focus of the apparatus. Fig. 7 is a sectional view of a modified construction omitting the ground glass, the back slide, and the rear aperture. Fig. 8 is a sectional view showing a modified construction in which the case is provided with thin metallic end pieces and thin metallic light excluding divisions, whereby space is economized and length of the apparatus is reduced.

Fig. 9 is a view, partly in section, of the spool-shaft.

Referring to the drawings, in which like letters and numerals of reference denote corresponding parts in all the figures, A designates the case which contains all the operating mechanism of the apparatus, which case may be constructed rectangular in shape with light-tight joints. This case is constructed with an open front, and on the top of said case is placed a level G extending longitudinally of the case, said level having its center adapted to align with the sight V' on the top of the case as shown by the plan view Fig. 1 of the drawings.

To assist in aiming the instrument, I provide the marginal sights 10 on the frame on either side of the lens-tube, by means of which the operator is enabled to see at a glance exactly what amount of field the lens in use on the instrument will cover as he has previously set the marginal sight 10 to the proper positions in line with the indicating marks on the scales S', S', on the sight-plate R, by moving them in the slots T', T', so that they will take in the same number of degrees as the angle of his lens when in use will admit, whereby the operator is not required to view the field through the camera every time a picture is taken, and a more serviceable method employed.

A frame M is adapted to fit snugly in the case A and the front B of said frame projects beyond the edges thereof and forms a front for the case and fits flush therewith to exclude all light from the interior of the apparatus. This front piece is provided with the rabbet joint V'' and after being placed in the case the parts are fastened together by suitable clasp devices or hooks 1, as desired.

The front B of the apparatus carries the sight-plate R which is fitted on and attached to the upper edge of the front B as shown by Figs. 1 and 2 of the drawings, said sight plate R being provided with the central sight V', the adjustable side-sights 10 and the scales S' S' adapted for use in connection with the side sights 10, 10, to indicate the range of field of the camera. In the center of this front B is a telescopical section C which be can telescoped within the frame or projected therefrom when it is desired to use the apparatus. To accomplish the telescopical movement of the section C without allowing the rays of light to enter the apparatus, I construct said section with flanges 2, 3, on its inner and outer edges, which flanges lap over the frame, and in the edges of said frame are secured strips of packing W'. I also provide the light-excluding slide O which can be adjusted in place and used as may be desired. The slide O is fitted in suitable guides or ways, o, provided on the inside of the telescopical section, C, as shown by Fig. 3 of the drawings, and when it is desired to prevent the rays of light from entering the camera before the apparatus is to be used or when adjusting any of the parts thereof, this slide O can be closed across the section, C, between the lens or light-inlet of the camera and the sensitized film at the back, rear side thereof. This slide O can be adjusted from one side of the section C as ready access can be had thereto when the section, C, is projected beyond or drawn outward from the casing and front of the camera, as will be readily understood. By this telescopical construction of the section C a considerable amount of valuable space is saved because the section can be moved into the interior of the frame or case when the apparatus is not in use, and it then presents a compact form suitable for transportation, which is especially desirable in this class of cameras. When the apparatus is to be used, this section C can be projected until the flanges 2 engage with the front B of the frame.

In the back of the frame or case A is an aperture N, and a slide K is arranged to operate in the grooves 4 to close or open said aperture as desired, as shown by Figs. 3 and 4, the aperture disclosing a ground glass J arranged in the frame or case inside of the slide K.

Secured to the front B of the camera frame and casing, on either side of the telescopical section C, are two light excluding partitions or divisions E, E which protect the rolls of film hereinafter mentioned, from the action of the light passing through the lenses. The supply spool T is secured on a shaft P which is journaled in bearings in the frame M, as shown by Fig. 6 and it has a slot or opening 12 in which one end of the film is secured and then the film is wound on the spool until it is full. The shaft on which the spool is secured is fastened in place by means of a cap Q and pin Q' which form a bearing for said shaft. The film if wound upon the supply spool T, and the free end thereof is passed around a measuring and guide roller H', secured on a shaft I', across the front face of the ground glass. From thence said film passes around another guide roller H secured on a shaft I and thence around another spool V. The film may be wound on the take-up spool V in the reverse direction to the winding of the film on the supply-spool T, or the film may be wound on the take-up spool V in the same manner as the supply spool so that both of the spools T and V may turn in the same direction and the heads or handles thereon rotate simultaneously in the same direction, whereby the operation of the rolls and adjustment of the film are greatly facilitated.

Secured on the partitions or divisions E and projecting over the spools T and V are two spring arms Y which carry bearing rollers X. These bearing rollers are adapted to bear on the film wound on the spools T and V, respectively, and serve the purpose of preventing the end of the film from flying loose when the spool is being placed in the spool frame or being taken from said frame. The film can then be wound tightly on the spool and the compact wrapping preserved, and any tendency of the film to unwind is prevented. The caps or bearing plates Q for said rolls have corrugated peripheries as shown in Fig. 2, and a spring brake is secured on the frame and provided with the projecting arms 13, 14 as shown by Fig. 2 of the drawings, arranged to bear against the corrugated edges of the caps, said spring arms having slight bends or projections 15 which fit in the corrugations and operate to steady the rotation of the spools T, V.

The supply spool T is constructed of two pieces 16, 17, secured together in a suitable manner, and the larger piece 16 has a hole 8, square or polygonal in cross section, in which the shaft P is fitted.

The guide roller H' is provided with perforators L at either end of the same, which project slightly beyond the surface of said roller and perforate the sensitized film at each rotation. Thus every length of the film which is measured off, in a manner hereinafter described, is perforated and marked by the perforators L two, three or more times, and these perforations indicate to the operator the lines of division of the film to divide the several pictures preparatory to development. The circumference of this measuring roller H' is such that it will require three revolutions thereof to mark the limits of each picture length, and the operator can thus readily tell where to divide the pictures by counting the perforations.

In the corner of the case where the guide and measuring rollers are located, are curved recesses A², and said rollers extend partially into said recesses. The film, which passes around the roller close to the frame, extends across the face of the ground glass and around the other guide roller H. After passing around the guide roller in the same direction as it passes around the measuring roller H', the film may be crossed to the inside of the take-up spool and secured thereon to be wound up as operated, or it can be wound as shown in Fig. 4.

To enable the operator to manipulate the supply and take up spools T, V, the shafts on which they are secured extend through the frame M and are provided with the ratchet wheels or caps Q, as heretofore described, and the shafts pass only half way through the caps Q, thus leaving a hole for inserting a key T'', as shown in Fig. 9. The key T'' is fitted through openings Q'' in the case A provided for that purpose as shown by Fig. 4 of the drawings. As the take-up spool V is rotated to present a new surface on the film, the supply spool T is also rotated, and the spring arms 13, 14, which bear on the corrugated peripheries of the caps Q, as shown by Fig. 2 of the drawings, regulate the movement of each spool and cause them to rotate simultaneously and regularly; the projections 15 fitting in the recesses in the periphery of the caps.

The lens-holding tube C' is arranged to slide or telescope in the telescopical front section C, and this tube is provided with the annular flanges F' and F'' on the inner and outer ends respectively. The lens-holding tube C' fits snugly in the opening provided for it in the section C and the flanges F', F'' engage with an annular ring or cap 9 having packing W, which fits around the opening in said section C; and thus the lens-holding tube is adapted to slide in and out of the telescopical section C, and at the same time a light-tight joint is preserved throughout, which is necessary in this class of inventions. These flanges F', F'', may be properly designated as the caps of the cylinder forming the outside lens-holding tube, as they are screwed to the respective ends of said tube, and the inner flange or cap F' has an inward projection E' constituting the support for the interior tube for holding the lenses, as shown in Figs. 3 and 4.

In the rear part of the frame, the light excluding divisions E extend almost to the back interior side of the said frame, and between the back ends of the divisions E, are two film-edge-holders F, extending between said divisions E, E, which film-edge-holders hold the edge of the film in proper position as it passes along from one guide roller to the opposite guide roller. The divisions E are secured to the front B of the case A as clearly shown in Figs. 3, 4, 8 and 9 of the drawings, and they are held firmly in place between the top and bottom of said frame by the bolts X'', X'' which clamp the top and bottom together and the divisions are held rigidly between them.

The telescopical front section C of the holder is arranged to slide easily in the opening provided for it in the front B, and when extended, the flange 2 on its rear edge fits flush against the partitions E and front B, and the packing W' serves to form an additional precaution against admitting light to the interior of the holder. The lens-tube C' also slides or telescopes into the front section C and the interior of the holder, and also has packing W to exclude the light, and the lens-tube is provided with a scale D' (Fig. 7) on its outer surface, by means of which the operator is enabled to determine, after a little experimenting, exactly how far to project the lens-tube in order to obtain the correct focus, and the scale is read with reference to its position to the cap 9 around the opening in the telescopical front section C.

When the operator desires to present a new section or surface of the film in its proper position for an exposure, the take-up spool is turned which causes the film to unwind from the supply spool T and pass to its proper position behind the lens, such section or surface of the film occupying the space at the rear of and between the lines of the light-excluding divisions E, E. After passing from the supply spool T the film goes around the measuring and guide roller H', and at each rotation thereof the film is marked or perforated by the perforators L, every third mark of which perforators designates the exact dividing line between the latent impressions.

In Fig. 4 I have illustrated a modified construction of the holder which consists, essentially, in securing the lens-tube C' on a movable piece D which is arranged to slide vertically in the front B of the holder. This construction permits the lens to be moved up or down and when not in use the lens-tube can be moved backward into the interior of the holder as in the preferred construction.

I have shown a modified construction in Fig. 8 and 9. In the first named view, Fig. 8, the glass J, the slide K and aperture N are omitted, and in Fig. 9 the end walls 20 of the holder and the partitions or divisions E, E, are made of a light metallic substance which secures greater space with the same size holder.

When it is desired to adjust the camera, the sliding or telescopical front C is drawn outward to its full limit, and the lens tube projected or adjusted to the proper focal point by focusing the lens on the ground glass J on the inside of the back of the holder; and the operator notes the position of the lens-tube by observing the position of the scale D' in relation to the ring or cap 9 through which the lens-tube slides. The lens having once been adjusted to the proper focal point it will be found to be correct when again placed at the same position on the scale D', for any view that includes only distant objects and those not nearer the instrument than the depth of focus of the lens used will include in proper focus.

By very little experimenting and noting results by focusing objects at different distances, the operator will be able to know just how many degree marks on the scale D' to allow for any estimated distance between the instrument and the principal field of view, thus obviating the necessity of finding the focus on the view by an adjustment of the image on the ground glass of the instrument every time before a view is made.

In preparing the apparatus for operation, the spool frame M is withdrawn from the case A and a spool T wound with a sensitized film is properly placed in the holder. Then the spool shaft P is passed down through the center of the spool, thereby pivoting the spool in the frame M; the end of the film is then passed around the measuring roller, then across the back interior side of the holder and around the roller H, thence the film may be crossed to the inner side of the take-up reel V, or it may be taken directly up to the same, and it is secured thereto to be wound, after the picture is taken. The frame containing the operating mechanism can then be replaced in the case A which forms a light-tight covering and unites in a light-tight manner with the front B of the case by the rabbet-joint V''. See Fig. 3.

By means of the center sights V' the operator is able to aim his camera direct for the center of the field required to be impressed on the film, and by the marginal sights 10, 10, the operator is enabled to see at a glance exactly what amount of field the lens then in use on the instrument will include as he has previously set the sliding marginal sights 10, 10 to take in the same number of degrees as the angle of his lens will admit; thus dispensing with the necessity of focusing on the ground glass before making each picture. The film, having received the latent impression, can now be wound on the reel or take-up spool V by the aid of the key T'', and every picture length of film is perforated by the perforators L on the roller H', which perforations indicate to the operator where the divisions are to be made to divide the several latent impressions preparatory to development.

Having thus fully described my invention, what I claim as new, and desire to secure by Letters Patent of the United States, is—

1. In a roll holding photographic apparatus, the combination of the guide and measuring roller H', and the guide roller H at the back of the holder, the supply and take-up spools in front of said rollers, the spring arms Y carrying the bearing rollers X arranged in contact with said spools, and the light-excluding divisions, E, substantially as described.

2. In a roll holder, the combination of a frame carrying the operating mechanism, a case having an aperture in the back thereof, the glass plate J, a slide or door K, the film-edge holder F, the light excluding slide O, and the light excluding division secured to the front of said frame and extending close to the plate J, as and for the purpose described.

3. In a roll holder, the combination of a frame carrying the operating mechanism and having a movable section on the front thereof, the lens-tube adapted to telescope in said section, the guide rollers at the back of the frame, the spools in front of said rollers, and the light excluding divisions, as and for the purpose described.

4. In a roll holder, the combination of the frame carrying the operating mechanism, the supply and take up spools in the front part of said frame, the rollers H, H', in rear of said spools, the light excluding divisions within the frame and extending from the front thereof close to the back, and a lens tube secured on the front of said frame and adapted to telescope within the same, as and for the purpose described.

5. In a roll holder, the combination of a frame carrying the operating mechanism, a case having an aperture in the back thereof, the diverging light excluding divisions, a supply spool and guide and measuring roller placed behind one division, and a take up spool and guide roller behind the other partition or division, as and for the purpose described.

6. In a roll holder, the combination of a frame carrying the operating mechanism, the supply and take-up spools at opposite ends of the frame near the front thereof, the rollers H, H', in rear of said spools, the light excluding divisions secured to the front of the frame and extending rearward toward the back thereof and serving to exclude the rays of light from the spools and rollers, and a lens mounted on the front of the frame and adapted to throw an image between said divisions, as and for the purpose described.

7. In a roll holder, the combination of a case, the frame carrying the operating mechanism and having the movable section in the front thereof, the light excluding divisions secured to the front of said frame on either side of the movable section and diverging to the back of the frame, and the spools and rollers arranged on opposite sides of said divisions as and for the purpose described.

8. In a roll holder, the combination of a case, a frame carrying the operating mechanism and adapted to slide within the case, a telescopical front section in the front of said frame, the light-excluding divisions within the case and arranged on either side of the telescopical section, and the supply and take-up spools situated in the front of the frame between the partition and the adjacent end of the case, respectively, as and for the purpose described.

9. In a roll holder, the combination of a case, a frame arranged to slide therein, the light-excluding divisions within the frame, the supply and take-up spools situated in compartments between the case and said light-excluding divisions, and the rollers arranged to bear on said spools, as and for the purpose described.

10. In a roll holding photographic apparatus, the combination with a case, a frame adapted to slide therein, the movable section on the front of said frame and provided with an opening, the annular ring or cap fitted around said opening, and a lens-tube adapted to slide in said movable section and having the flanges F'', F' at its respective ends, and the projection E' on the inner flange to receive the interior lens-holding tube, as and for the purpose described.

11. In a roll holding photographic apparatus, the combination with a case, of transverse light-excluding divisions situated within the case and forming therein a central compartment and two end compartments, the supply spool and take-up spool situated respectively in said end compartments, the measuring and guide rollers in said end compartments and in rear of the supply and take up spools, respectively, and a lens which is in line with the central compartment of the case, as and for the purpose described.

12. In a roll holding photographic apparatus, the combination of a frame carrying a lens, the case within which the frame is inclosed, transverse light-excluding divisions rigid with the frame and arranged to divide the case into three compartments, a supply spool in one of the end compartments with a measuring roller in the same compartment and to one side of the supply spool, a take-up spool in the other end compartment and a guide roller in the same compartment with said take-up spool and to one side of the same, as and for the purpose described.

13. In a roll holder photographic apparatus, the combination of a case, a frame inclosed within the case, the transverse light-excluding divisions rigid with the frame and extending nearly to the back of the case, said divisions serving to divide the case into a central compartment and two end compartments, the supply spool and take up spool situated respectively in the end compartments of the case, the guide rollers also within the end compartments and adjacent to the rear terminal ends of the light-excluding divisions, the stationary film-guides situated between and in line with the guide rollers at the rear of the case, and a lens, combined and arranged as and for the purpose described.

14. In a roll holding photographic apparatus, the case having its interior divided into a central compartment and two end compartments situated on opposite sides of said central compartment, a supply spool in one of the end compartments, a take up spool in the other end compartment, the film-guides arranged within the case at the rear of the compartments therein and a lens mounted in line with the central compartment, as and for the purpose described.

15. In a roll holding photographic apparatus, a case provided in its front with a light-inlet and adapted to contain a movable film at its rear side, in combination with light-excluding divisions situated within the case on opposite sides of the light-inlet in the front thereof, and the supply and take up spools situated on opposite sides of the light-excluding divisions and shielded thereby from the rays of light which have access to the interior of the case through the light-inlet in the front thereof, whereby a sensitized film to be carried by said supply and take-up spools has a limited area exposed to the rays of light between the lines of the light-excluding divisions, as and for the purpose described.

16. In a roll holding photographic apparatus, a case having its interior divided into a central compartment and isolated end compartments, and provided in its front with a light-inlet and with the aperture in its back, said light-inlet and aperture adapted to communicate with the central compartment, in combination with the supply and take-up spools, situated in the respective end compartments of the case, a movable focusing surface in said aperture, and a slide at the rear side of said case to close the aperture therein, substantially as and for the purpose described.

17. In a roll holder photographic apparatus, the combination of a case provided with light-excluding divisions forming two outer compartments, and having a central compartment between said outer compartments, guide rollers near the back interior side of the case, a supply spool in one of the outer compartments, a take-up spool in the opposite end compartment, and a lens mounted in line with the central compartment and adapted to project an image into said central compartment, as and for the purpose described.

In testimony whereof I affix my signature in presence of two witnesses.

DAVID H. HOUSTON.

Witnesses:
C. D. FIELD,
H. C. BARBER.